(12) United States Patent
Chang (10) Patent No.: US 11,467,403 B2
(45) Date of Patent: Oct. 11, 2022

(54) OPERATING METHOD AND ELECTRONIC SYSTEM

(71) Applicant: HTC Corporation, Taoyuan (TW)

(72) Inventor: Ching-Yi Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 71 days.

(21) Appl. No.: 16/999,033

(22) Filed: Aug. 20, 2020

(65) Prior Publication Data

US 2022/0057634 A1 Feb. 24, 2022

(51) Int. Cl.
*G02B 27/01* (2006.01)
*G06F 3/01* (2006.01)
*G08C 23/04* (2006.01)

(52) U.S. Cl.
CPC ........... *G02B 27/017* (2013.01); *G06F 3/013* (2013.01); *G02B 2027/0163* (2013.01); *G08C 23/04* (2013.01)

(58) Field of Classification Search
CPC ....... G02B 27/017; G06F 3/013; G06F 3/165; G06F 3/04845; G06K 9/00838
See application file for complete search history.

(56) References Cited

U.S. PATENT DOCUMENTS

| | | | |
|---|---|---|---|
| 9,706,910 B1 * | 7/2017 | Blaha | A61B 3/111 |
| 10,747,310 B1 * | 8/2020 | Cavin | G06T 19/006 |
| 2015/0283902 A1 * | 10/2015 | Tuukkanen | G06K 9/00838 |
| | | | 340/461 |
| 2016/0262608 A1 * | 9/2016 | Krueger | G06T 19/006 |
| 2017/0329488 A1 * | 11/2017 | Welker | G06F 3/04845 |
| 2018/0008141 A1 * | 1/2018 | Krueger | A61B 5/11 |
| 2018/0350150 A1 * | 12/2018 | Powderly | G02B 27/017 |
| 2020/0000166 A1 * | 1/2020 | Hui | G06F 3/165 |
| 2020/0054398 A1 * | 2/2020 | Kovtun | G16H 40/63 |
| 2021/0014748 A1 * | 1/2021 | Peitzer | H04W 16/28 |
| 2021/0286502 A1 * | 9/2021 | Lemay | G06F 3/013 |
| 2021/0385755 A1 * | 12/2021 | Zavesky | H04W 52/228 |
| 2021/0400539 A1 * | 12/2021 | Wang | H04W 72/048 |

* cited by examiner

*Primary Examiner* — Fred Tzeng
(74) *Attorney, Agent, or Firm* — Winston Hsu (57) ABSTRACT

An operating method of an electronic system is provided. The operating method of the electronic system includes generating a first user input by a first input device and performing a first input control according to the first user input during a first input operation mode, determining whether a light intersection point of a ray emitted by a second input device with a virtual reality (VR) environment exists in the VR environment, switching to a second input operation mode in response to determining that the light intersection point of the ray with the VR environment exists in the VR environment and generating a second user input by the second input device and performing a second input control according to the second user input during the second input operation mode.

9 Claims, 6 Drawing Sheets

OPERATING METHOD AND ELECTRONIC SYSTEM

BACKGROUND OF THE INVENTION

1. Field of the Invention

The present invention relates to an operating method and an electronic system, and more particularly, to an operating method and an electronic system capable of quickly and automatically switching between two different input operation modes.

2. Description of the Prior Art

A head-mounted display (HMD) is a type of display device, worn on the head, which displays images near the user's eyes. A user may wear the HMD displaying three-dimensional (3D) (or non-3D) images or other computer generated content for virtual reality (VR) experience. The user can interact with a VR system by using various input methods. For example, the user can use an eye tracking device to generate a control action for acting as a user input. The eye tracking device may be used to detect gaze interactions with user interface objects displayed on the HMD so as to generate user inputs. However, if the user wants to use another input method to generate user inputs, the user may need to manually change the system configuration and make a selection of the other input scheme to switch to another input scheme for generating the user input, thus it is inconvenient and time consuming for the user who requires various input methods to provide user inputs. Thus, there is a need for improvement.

SUMMARY OF THE INVENTION

It is therefore a primary objective of the present invention to provide an operating method and an electronic system capable of quickly and automatically switching between two different input operation modes.

According to an embodiment of the present invention, an exemplary operating method of an electronic system is disclosed. The operating method of the electronic system, comprises generating a first user input by a first input device and performing a first input control according to the first user input during a first input operation mode; determining whether a light intersection point of a ray emitted by a second input device with a virtual reality (VR) environment exists in the VR environment; switching to a second input operation mode in response to determining that the light intersection point of the ray with the VR environment exists in the VR environment; and generating a second user input by the second input device and performing a second input control according to the second user input during the second input operation mode.

According to an embodiment of the present invention, an exemplary electronic system is disclosed. The exemplary electronic system comprises a first input device, configured to generate a first user input during a first input operation mode; a second input device, configured to generate a second user input during a second input operation mode; and a processor, configured to perform a first input control according to the first user input during the first input operation mode and determine whether a light intersection point of a ray emitted by the second input device with a virtual reality (VR) environment exists in the VR environment; wherein the processor is configured to control the electronic system to switch to the second input operation mode in response to determining that the light intersection point of the ray with the VR environment exists in the VR environment and perform a second input control according to the second user input during the second input operation mode.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
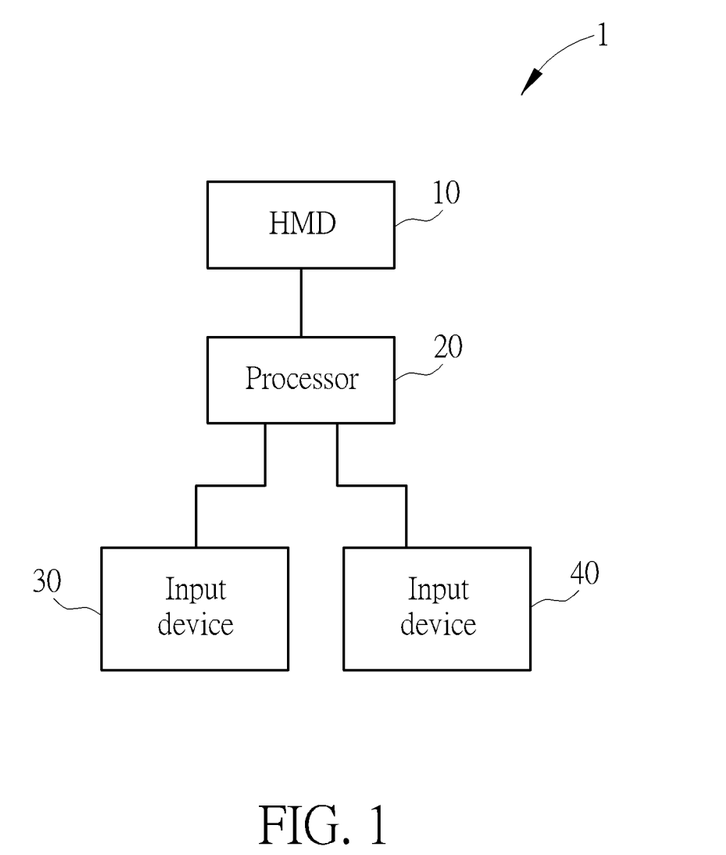
FIG. 1 is a schematic diagram of an electronic system according to an embodiment of the present invention.

Please refer to FIG. 1, which is a schematic diagram of an electronic system 1 according to an exemplary embodiment of the present invention. The electronic system 1 may be a virtual reality (VR) system. The electronic system 1 includes a head-mounted display (HMD) 10, a processor 20 and input devices 30, 40. The processor 20 is coupled to the HMD 10 and the input devices 30, 40. The processor 20 is configured to render and generate VR contents of a VR environment (also called VR space) 200. The processor 20 may be a central processing unit (CPU), a microprocessor, a digital signal processor (DSP), a programmable controller, a graphics processing unit (GPU), a programmable logic device (PLD) or other similar devices or combination of these devices, but not limited thereto. The HMD 10 is configured to display the VR contents of the VR environment 200 generated by the processor 20 for the user, so that the user can be immersed into the VR environment. For example, the HMD 10 may include a display screen. The VR contents may be displayed on the display screen of the HMD 10 that is viewable to the user. Therefore, the user may watch and interact with the content rendered on the display screen of the HMD 10.

The input device 30 is configured to generate a first user input. For example, the input device 30 may be an eye tracking circuit, a keyboard, a mouse, a pointer a controller, a touch based input device, a voice recognition-based input device or any other suitable device for receiving user's action requests or capable of allowing the user to enter input information. The input device 40 is configured to generate a second user input. For example, the input device 40 may be an infrared remote controller or any other suitable device capable of emitting or cast ray for producing user inputs and allowing the user to operate.

Figure 2:
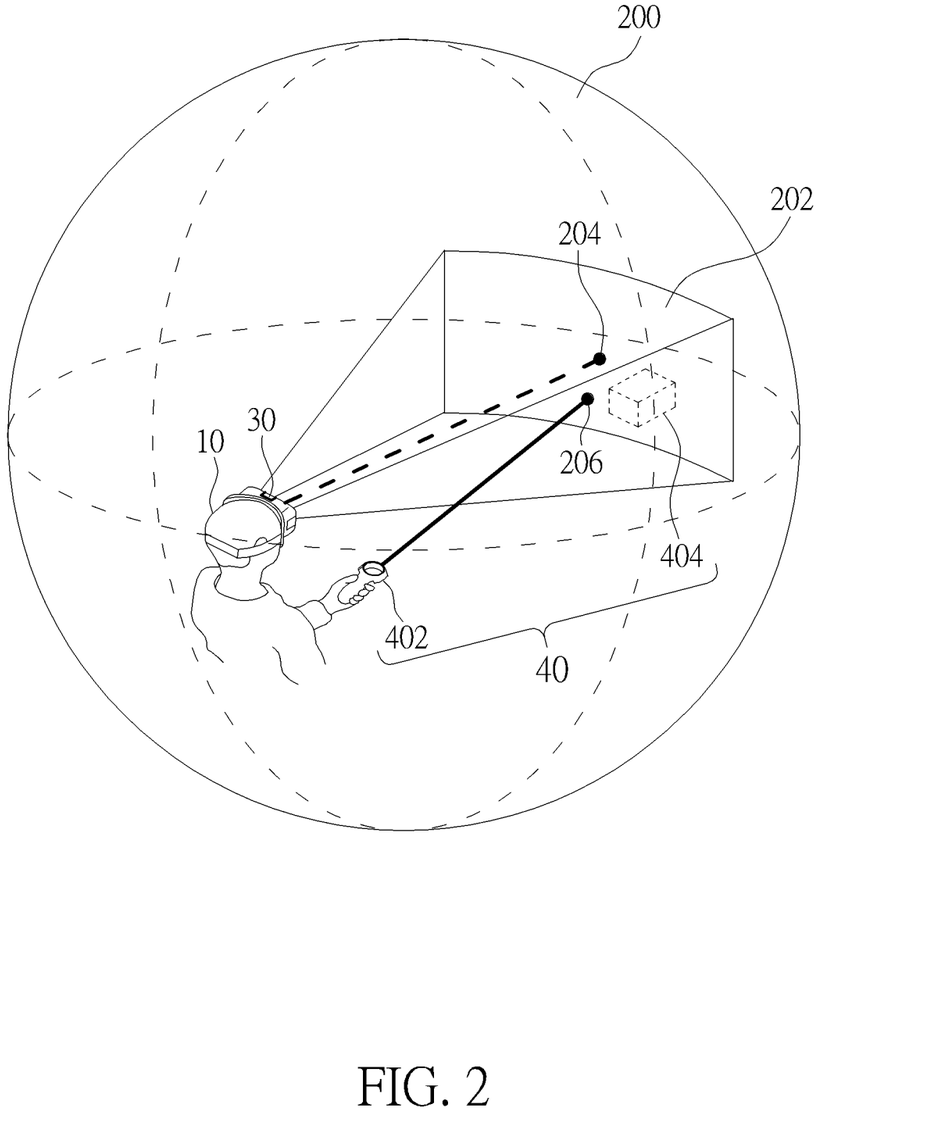
FIG. 2 is a schematic diagram illustrating operations of the input devices shown in FIG. 1 according to an embodiment of the present invention.

FIG. 2 is a schematic diagram illustrating operations of the input device 30 and the input device 40 shown in FIG. 1 according to an exemplary embodiment of the present invention. An application executing on the electronic system 1 supports a VR environment 200. The input device 30 may be an eye tracking circuit. The input device 30 may be disposed on the HMD 10. The input device 30 is configured to detect eye information of a user wearing HMD 10. The eye information may be a gaze point, a gaze location, a pupil location and the like, but not limited thereto. As shown in FIG. 2, the input device 30 may detect a gaze point 204 in a field of view (FOV) 202 of the VR environment 200. The gaze point 204 is the intersection point between the gaze ray cast from the user's eyes and the VR environment 200. The gaze point 204 may be acted as a user input. Moreover, the input device 40 may be an infrared remote controller. The input device 40 includes a light emitting circuit 402 and a light detection circuit 404. The light emitting circuit 402 may include light emitting diodes (LEDs) or laser diodes (LDs). During operation, a user may hold the light emitting circuit 402 of the input device 40 in his/her hand and operate the light emitting circuit 402. As shown in FIG. 2, the light emitting circuit 402 projects a ray R toward the VR environment 200 such that the light detection circuit 404 detects a light intersection point 206 between the ray R and the VR environment 200. The light intersection point 206 may also be acted as a user input.

Figure 3:
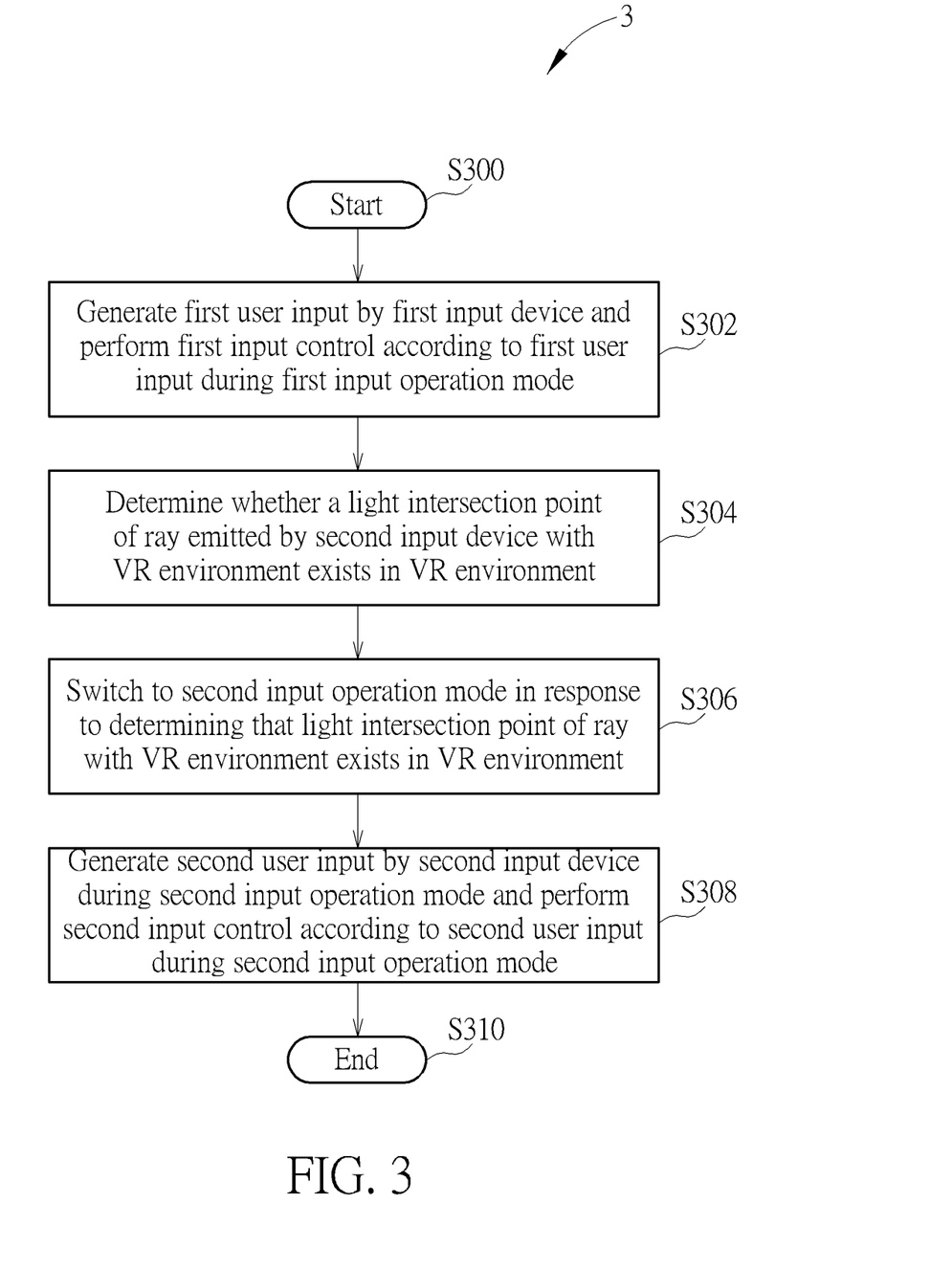
FIG. 3 is a flow diagram of a procedure according to an embodiment of the present invention.

For an illustration of the operations of the electronic system 1, please refer to FIG. 3. FIG. 3 is a flow diagram of a procedure 3 according to an embodiment of the present invention. The flowchart in FIG. 3 mainly corresponds to the operations on the electronic system 1 shown in FIG. 1. The procedure 3 includes the following steps:

Step S300: Start.

Step S302: Generate a first user input by a first input device and perform a first input control according to the first user input during a first input operation mode.

Step S304: Determine whether a light intersection point of a ray emitted by a second input device with a VR environment exists in the VR environment.

Step S306: Switch to a second input operation mode in response to determining that the light intersection point of the ray with the VR environment exists in the VR environment.

Step S308: Generate a second user input by the second input device during the second input operation mode and perform a second input control according to the second user input during the second input operation mode.

Step S310: End.

According to the procedure 3, in Step S302, the electronic system 1 operates in a first input operation mode. The input device 30 is configured to generate a first user input in response to operations of a user during the first input operation mode. The processor 20 is configured to perform a first input control according to the first user input generated by the input device 30 during the first input operation mode.

Figure 4:
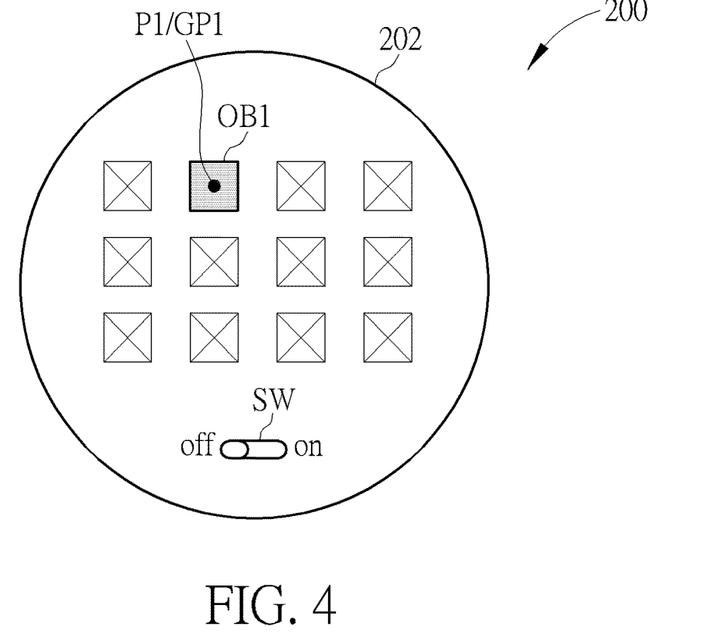
FIGS. 4-7 are schematic diagrams illustrating operations of electronic system shown in FIG. 1 according to alternative embodiments of the present invention.
Figure 6:
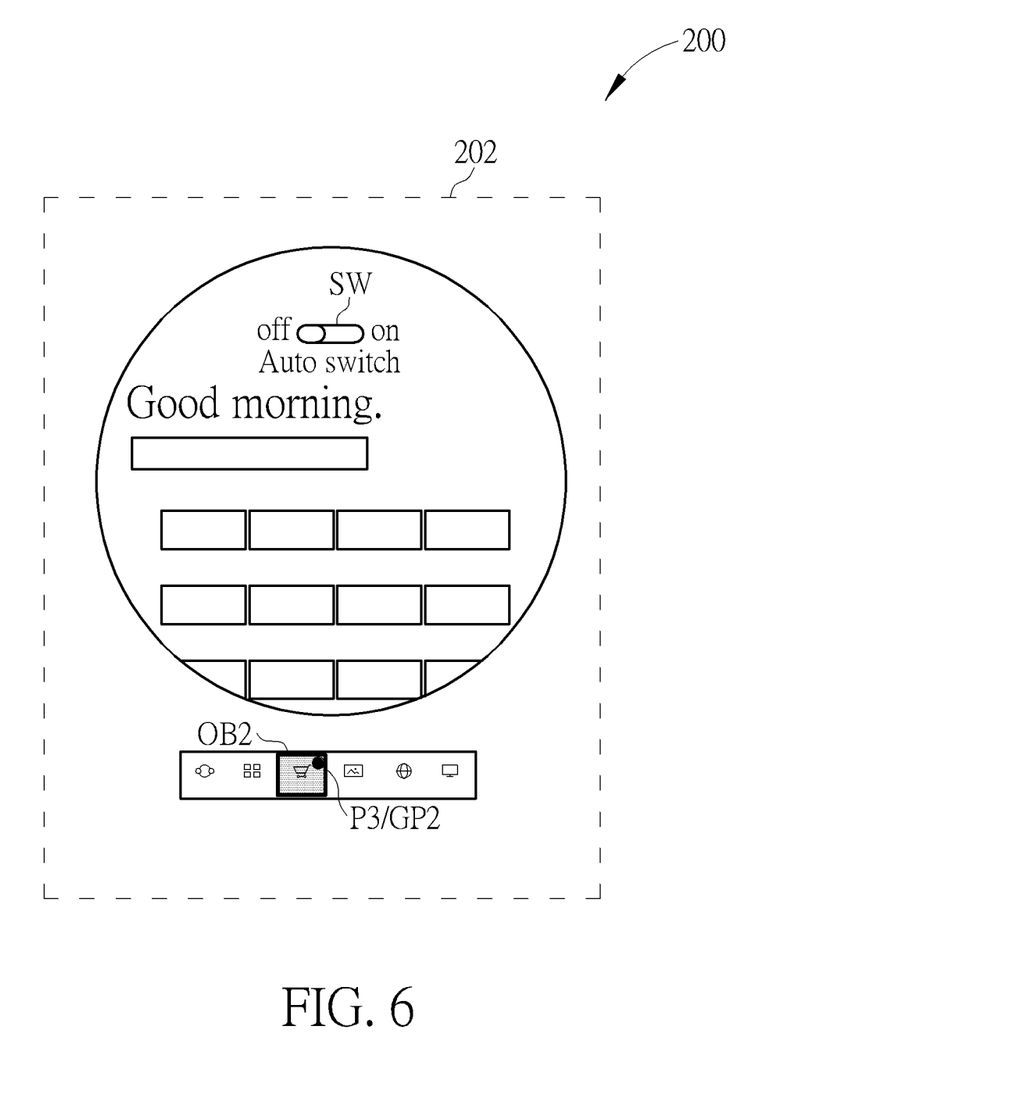

For example, please refer to FIGS. 2, 4 and 6. The input device 30 may be an eye tracking circuit. As shown in FIG. 4, the input device 30 captures images of user's eyes and detects a gaze point of the user wearing the HMD 10 at a position P1 in the VR environment 200 during the first input operation mode. The position P1 of the detected gaze point is in the area of the FOV 202 of the VR environment 200. As shown in FIG. 6, the input device 30 captures images of user's eyes and detects a gaze point at a position P3 in the VR environment 200 during the first input operation mode. The position P3 of the detected gaze point is in the area of the FOV 202 of the VR environment 200. The detected gaze points may be processed as user inputs for the electronic system 1.

Moreover, the processor 20 is configured to perform a first input control according to the gaze point detected by the input device 30 during the first input operation mode. The processor 20 may edit the VR contents of the VR environment 200 to perform a first input control process according to the gaze point detected by the input device 30. For example, the processor 20 may add a cursor, a pointer, or similar indicator at the position of the detected gaze point in the VR contents of the VR environment 200 rendered on the HMD 10 based on the gaze point detected by the input device 30. For example, as shown in FIG. 4, a scene of an object item selection is displayed in the FOV 202 of the VR environment 200. As the position P1 of the gaze point is detected by the input device 30, the processor 20 adds a solid circle icon GP1 filled with color at the position P1 of the VR content of the VR environment 200 for indicating the detected gaze point. An object OB1 near the position P1 of the gaze point is selected and highlighted. Under such a situation, when the user wearing the HMD 10 sees the solid circle icon GP1 and the highlighted object OB1 in the VR content of the VR environment 200 shown in FIG. 4, the user may understand and perceive that the object OB1 near the position P1 of the gaze point is selected according to the control operation of the user's eye during the first input operation mode. For example, as shown in FIG. 6, a scene of a menu selection is displayed in the FOV 202 of the VR environment 200. As the position P3 of the gaze point is detected by the input device 30, the processor 20 adds a solid circle icon GP2 filled with color at the position P3 of the VR content of the VR environment 200 for indicating the detected gaze point. An object OB2 near the position P3 of the gaze point is selected and highlighted. When the user wearing the HMD 10 sees the solid circle icon GP2 and the highlighted object OB2 shown in FIG. 6, the user may understand and perceive that the object OB2 near the position P3 of the gaze point is selected according to the control operation of the user's eye during the first input operation mode.

In Step S304, the processor 20 is configured to determine whether a light intersection point of a ray emitted by the input device 40 with the VR environment 200 exists in the VR environment 200 during the first input operation mode. For example, the light detection circuit 404 may detect whether a ray emitted by the light emitting circuit 402 is cast into the VR environment 200. Since a ray cast into the VR environment 200 by the light emitting circuit 402, the ray may hit the VR environment 200 and the hit point is a light intersection point between the ray and the VR environment 200. Therefore, when detecting that a ray emitted by the light emitting circuit 402 is cast into the VR environment 200, the light detection circuit 404 may detect a light intersection point between the ray emitted by the light emitting circuit 402 of the input device 40 and the VR environment 200.

Further, the processor 20 determines whether a light intersection point of the ray emitted by the input device 40 with the VR environment 200 exists in the VR environment 200 based on detection result of the light detection circuit 404. In an embodiment, when the light detection circuit 404 of the input device 40 detects that there is a light intersection point of a ray emitted by the light emitting circuit 402 of the input device 40 and the VR environment 200, the processor 20 determines that a light intersection point of the ray emitted by the input device 40 with the VR environment 200 exists in the VR environment 200 accordingly. In an embodiment, when the light detection circuit 404 detects that there is a light intersection point between a ray emitted by the light emitting circuit 402 of the input device 40 and the VR environment 200 and the light intersection point falls within a first area of the VR environment 200, the processor 20 determines that a light intersection point of the ray emitted by the input device 40 with the VR environment 200 exists in the VR environment 200 and the light intersection point falls within the first area of the VR environment 200 accordingly. The first area of the VR environment 200 may be the area of the FOV of the user, a visible area, a user's fine focus area, a user's gaze area in the VR environment 200 or other specific area in the VR environment 200.

In addition, when no light intersection point of a ray emitted by the light emitting circuit 402 of the input device 40 and the VR environment 200 is detected, the electronic system 1 may continue to detect whether a light intersection point of a ray emitted by a second input device with a VR environment exists in the VR environment until a light intersection point is detected.

In Step S306, in response to determining that there exists a light intersection point of the ray with the VR environment 200, the processor 20 is configured to enable the electronic system 1 to switch to operate in a second input operation mode. The operation mode of the electronic system 1 is changed from the first input operation mode to the second input operation mode based on determining that the light intersection point of the ray and the VR environment 200 exists in the VR environment 200. In an embodiment, when determining that there is a light intersection point of the ray emitted by the input device 40 with the VR environment 200, the electronic system 1 may switch to operate in a second input operation mode controlled by the processor 20 in response. In an embodiment, when determining that there is a light intersection point of the ray emitted by the input device 40 with the VR environment 200 and the light intersection point falls within a first area of the VR environment 200, the electronic system 1 may switch to operate in a second input operation mode controlled by the processor 20 in response. In other words, when the electronic system 1 operates in the first input operation mode, the processor 20 performs the first input control according to the first user input generated by the input device 30 during the first input operation mode (Step S302) and also determines whether a light intersection point of the ray emitted by the input device 40 with the VR environment 200 exists (Step S304). Based on determining that a light intersection point of a ray with the VR environment 200 exists in the VR environment, the electronic system 1 is configured to switch to operate in a second input operation mode controlled by the processor 20.

In Step S308, the electronic system 1 operates in the second input operation mode. The input device 40 is configured to generate a second user input by the input device 40 in response to operations of the user during the second input operation mode. The processor 20 is configured to perform a second input control according to the second user input generated by the input device 40 during the second input operation mode.

Figure 5:
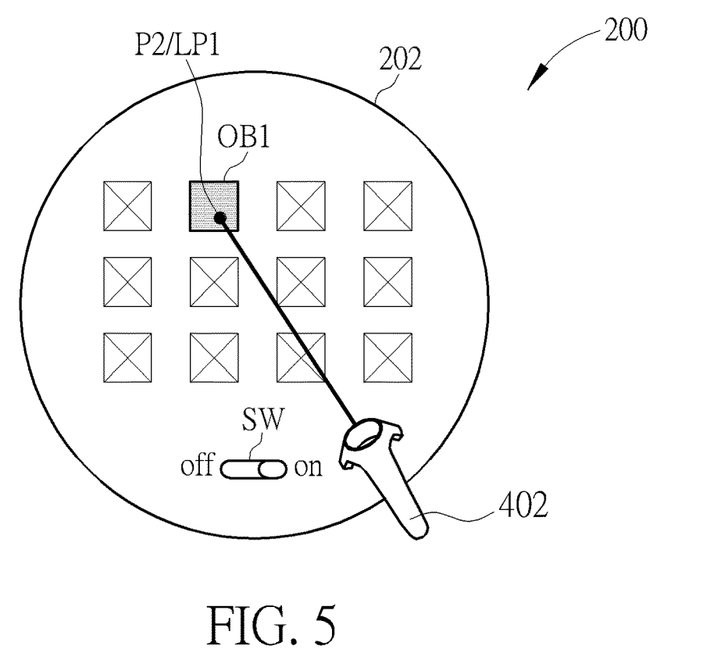

For example, please further refer to FIGS. 2 and 4-5. As shown in FIG. 4, during the first input operation mode, the input device 30 detects a gaze point of the user at the position P1 in the VR environment 200 during the first input operation mode and the processor 20 adds a solid circle icon GP1 at the position P1 and the object OB1 is selected and highlighted (Step 302). That is, the user utilizes the input device 30 to generate the user input during the first input operation mode. The processor 20 continues to determine whether a light intersection point of a ray emitted by the input device 40 with the VR environment 200 exists in the VR environment 200 during the first input operation mode (Step 304). Under such a situation, when a user wants to utilize a different input device (e.g., the input device 40) to generate the user input, the user may hold the light emitting circuit 402 of the input device 40 in his/her hand and operate the light emitting circuit 402. The user may aim the light emitting circuit 402 at the VR environment 200, such that the light emitting circuit 402 projects a ray toward the VR environment 200. As shown in FIG. 5, the light emitting circuit 402 projects a ray toward the VR environment 200 and the light detection circuit 404 detects a light intersection point between the ray and the VR environment 200 at a position P2. Accordingly, the processor 20 determines that a light intersection point of the ray emitted by the input device 40 with the VR environment 200 exists at the position P2 and controls the electronic system 1 to change the operation mode. The electronic system 1 switches to operate in the second input operation mode (Step 306).

Therefore, during the second input operation mode, the processor 20 may perform a second input control according to the second user input generated by the input device 40. As shown in FIG. 5, as the position P2 of the light intersection point is detected by the light detection circuit 404 of the input device 40, the processor 20 adds a solid circle icon LP1 filled with color at the position P2 of the VR content of the VR environment 200 for indicating the detected light intersection point. An object OB1 near the position P2 of the light intersection point is selected and highlighted. Under such a situation, when the user wearing the HMD 10 sees the solid circle icon LP1 and the highlighted object OB1 in the VR content of the VR environment 200 shown in FIG. 5, the user may understand and perceive that the object OB1 near the position P2 of the light intersection point is selected according to the control operation of the input device 40 during the second input operation mode.

Figure 7:
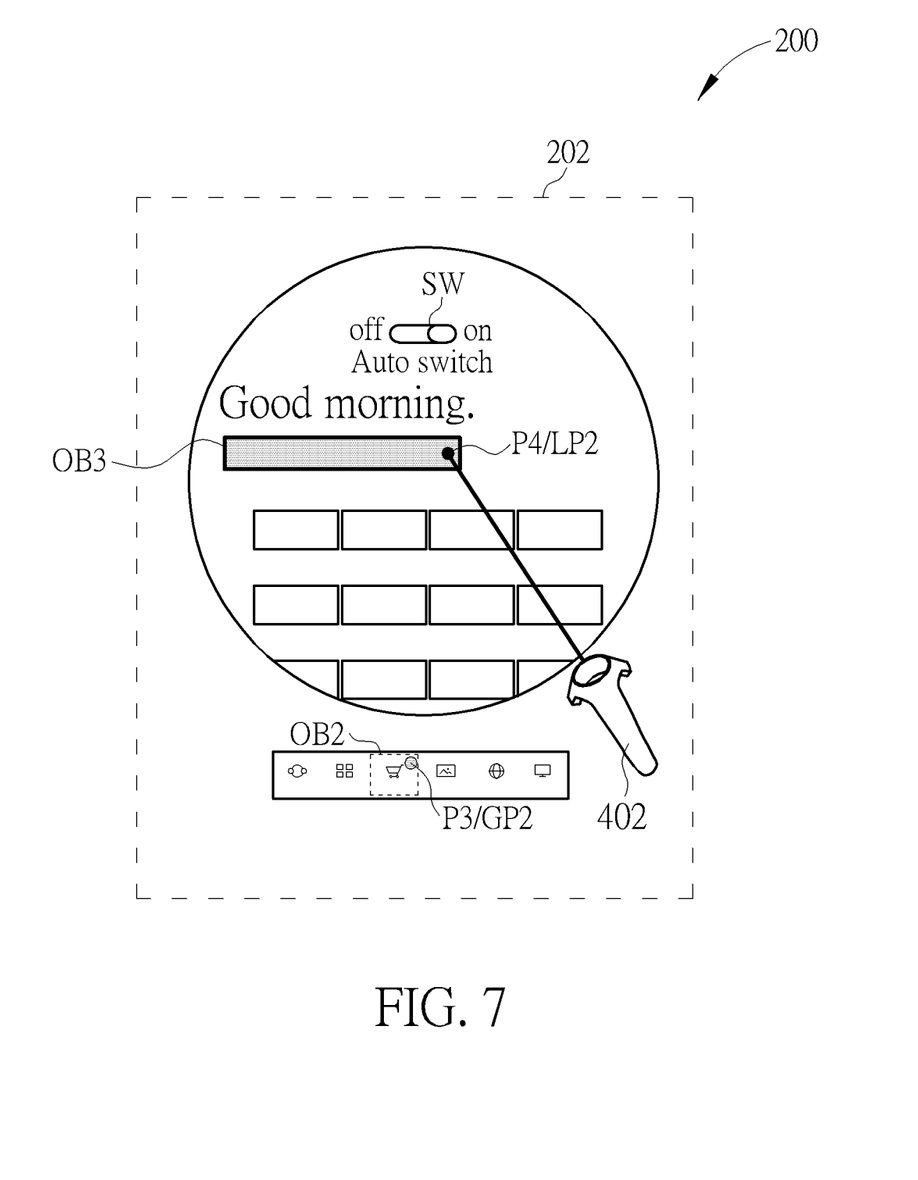

For example, please further refer to FIGS. 2, 6 and 7. As shown in FIG. 6, during the first input operation mode, the input device 30 detects a gaze point of the user at the position P3 in the VR environment 200 and the processor 20 adds a solid circle icon GP2 at the position P3 and the object OB2 is selected and highlighted (Step 302). The processor 20 continues to determine whether a light intersection point is detected during the first input operation mode (Step 304). If the user operates the light emitting circuit 402 of the input device 40 to project a ray toward the VR environment 200. As shown in FIG. 7, the light emitting circuit 402 projects a ray toward the VR environment 200 and the light detection circuit 404 detects a light intersection point between the ray and the VR environment 200 at a position P4. Accordingly, the processor 20 determines that a light intersection point of the ray emitted by the input device 40 with the VR environment 200 exists at the position P4. The processor 20 controls the electronic system 1 to switch to operate in the second input operation mode (Step 306). During the second input operation mode, the processor 20 may perform a second input control according to the second user input generated by the input device 40. As shown in FIG. 7, as the position P4 of the light intersection point is detected by the light detection circuit 404 of the input device 40, the processor 20 adds a solid circle icon LP2 filled with color at the position P4 of the VR content of the VR environment 200 for indicating the detected light intersection point. An object OB3 near the position P4 of the light intersection point is selected and highlighted.

In other words, when the electronic system 1 operates in the first input operation mode, the processor 20 performs the first input control according to the first user input generated by the input device 30 during the first input operation mode. As a user wants to utilize the input device 40 to generate the user input, the user just holds and operates the light emitting circuit 402 to project a ray toward the VR environment 200. Accordingly, the electronic system 1 may switch to operate in the second input operation mode, and the processor 20 performs the second input control according to the second user input generated by the input device 40 during the second input operation mode.

In Step S304, the processor 20 may determine whether an automatic mode switch function is enabled before determining whether a light intersection point of a ray emitted by the input device 40 with the VR environment 200 exists in the VR environment 200 during the first input operation mode. In response to determining that the automatic mode switch function is enabled, the processor 20 determines whether a light intersection point of a ray emitted by the input device 40 with the VR environment 200 exists in the VR environment 200 during the first input operation mode. In more detail, the processor 20 may determine whether an automatic mode switch function is enabled during the first input operation mode. When determining that the automatic mode switch function is not enabled, the procedure returns to Step S302, and then Step S302 is executed again. When determining that the automatic mode switch function is not enabled, the procedure returns to Step S302, and then Step S302 is executed again. When determining that the automatic mode switch function is enabled, the processor 20 begins to determine whether a light intersection point of a ray emitted by the input device 40 with the VR environment 200 exists in the VR environment 200 during the first input operation mode.

Moreover, a trigger graphical user interface (GUI) element or a physical object may be set for enabling or triggering an automatic mode switch function. The trigger GUI element may be a button, an icon, a menu item, a field, a list, a pop up trigger item, a checking box, a slider, etc. The physical object may be a physical button or a physical switch, but not limited thereto. For example, as shown in FIG. 4, an automatic mode switch button SW may be set in the VR content of the VR environment 200 for enabling or disabling the automatic mode switch function. For example, when the automatic mode switch button SW is switched to the ON state, the automatic mode switch function is enabled and available. When the automatic mode switch button SW is switched to the OFF state, the automatic mode switch function is disabled and unavailable.

In an embodiment, as shown in FIG. 4 and FIG. 6, the automatic mode switch button SW is switched to the OFF state indicating that the automatic mode switch function is disabled. In Step S304, the processor 20 may determine that the automatic mode switch function is disabled and the procedure returns to Step S302. The electronic system 1 continues to operate in the first input operation mode and the processor 20 performs the first input control according to the first user input generated by the input device 30. In an embodiment, as shown in FIG. 5 and FIG. 7, the automatic mode switch button SW is switched to the ON state indicating that the automatic mode switch function is enabled. In Step S304, the processor 20 may determine that the automatic mode switch function is enabled and the processor 20 begins to determine whether a light intersection point of a ray emitted by the input device 40 with the VR environment 200 exists in the VR environment 200. When a light intersection point of a ray emitted by the input device 40 with the VR environment 200 is detected and the electronic system 1 switches to the second input operation mode, the processor 20 performs the second input control according to the second user input generated by the input device 40. In other words, through the automatic mode switch button SW set in the VR environment 200, the user may decide whether to turn on or off the automatic mode switch function.

In Step S308, during the second input operation mode, the processor 20 performs the second input control according to the second user input generated by the input device 40. The input device 30 may continue to generate the first user input according to operations of the user and the first user input may not be utilized for performing input control by the processor 20. In an embodiment, during the second input operation mode, the input device 30 may continue to detect the gaze point such that the gaze point still following the user's focus. For example, as shown in FIG. 7, the color of the solid circle icon GP2 and the object OB2 may be grayed out for indicating that the object OB2 are not selected.

Those skilled in the art should readily make combinations, modifications and/or alterations on the abovementioned description and examples. The abovementioned description, steps, procedures and/or processes including suggested steps can be realized by means that could be hardware, software, firmware (known as a combination of a hardware device and computer instructions and data that reside as read-only software on the hardware device), an electronic system, or combination thereof. Examples of hardware can include analog, digital and mixed circuits known as microcircuit, microchip, or silicon chip. Examples of the electronic system may include a system on chip (SoC), system in package (SiP), a computer on module (CoM) and the electronic system 1. Any of the abovementioned procedures and examples above may be compiled into program codes or instructions that are stored in a computer-readable storage medium. The computer-readable storage medium may include read-only memory (ROM), flash memory, random access memory (RAM), subscriber identity module (SIM), hard disk, floppy diskette, or CD-ROM/DVD-ROM/BD-ROM, but not limited thereto. The processor 20 may read and execute the program codes or the instructions stored in the computer-readable storage medium for realizing the abovementioned functions.

In summary, the embodiments of the present invention provide an operating method of the electronic system capable of quickly and automatically switching between two different input operation modes. The embodiments of the present invention provide the operating method of the electronic system that allows the user to change to utilize another input application by using a more quick, simple and intuitive operation without inconvenient and time consuming manual operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An operating method of an electronic system, comprising:
   generating a first user input by a first input device and performing a first input control according to the first user input during a first input operation mode;
   determining whether a mode switch function is enabled and generating the first user input by the first input device and performing the first input control according to the first user input again during the first input operation mode in response to determining that the mode switch function is disabled;
   determining whether a light intersection point of a ray emitted by a second input device with a virtual reality (VR) environment exists in the VR environment in response to determining that the mode switch function is enabled;
   switching to a second input operation mode in response to determining that the light intersection point of the ray with the VR environment exists in the VR environment; and
   generating a second user input by the second input device and performing a second input control according to the second user input and not performing the first input control according to the first user input during the second input operation mode.

2. The operating method of claim 1, wherein the step of switching to the second input operation mode in response to determining that the light intersection point of the ray with the VR environment exists in the VR environment comprises:
   switching to the second input operation mode in response to determining that the light intersection point of the ray with the VR environment falls within a field of view of the VR environment.

3. The operating method of claim 1, wherein the first input device is an eye tracking circuit.

4. The operating method of claim 1, wherein the second input device is an infrared remote controller.

5. An electronic system, comprising:
   a first input device, configured to generate a first user input during a first input operation mode;
   a second input device, configured to generate a second user input during a second input operation mode; and
   a processor, configured to perform a first input control according to the first user input and determine whether a mode switch function is enabled during the first input operation mode, wherein in response to determining that the mode switch function is disabled, the first input device is configured to generate the first user input again and the processor is configured to perform the first input control according to the first user input again during the first input operation mode, wherein in response to determining that the mode switch function is enabled, the processor is configured to determine whether a light intersection point of a ray emitted by the second input device with a virtual reality (VR) environment exists in the VR environment;
   wherein the processor is configured to control the electronic system to switch to the second input operation mode in response to determining that the light intersection point of the ray with the VR environment exists in the VR environment, perform a second input control according to the second user input and not perform the first input control according to the first user input during the second input operation mode.

6. The electronic system of claim 5, wherein the processor is configured to control the electronic system to switch to the second input operation mode in response to determining that the light intersection point of the ray with the VR environment falls within a field of view of the VR environment.

7. The electronic system of claim 5, further comprising:
   a head-mount display, configured to display VR contents of the VR environment.

8. The electronic system of claim 5, wherein the first input device is an eye tracking circuit.

9. The electronic system of claim 5, wherein the second input device is an infrared remote controller.

* * * * *